E. KROMER.
FLY KILLER.
APPLICATION FILED MAY 25, 1914.
1,166,606.
Patented Jan. 4, 1916.
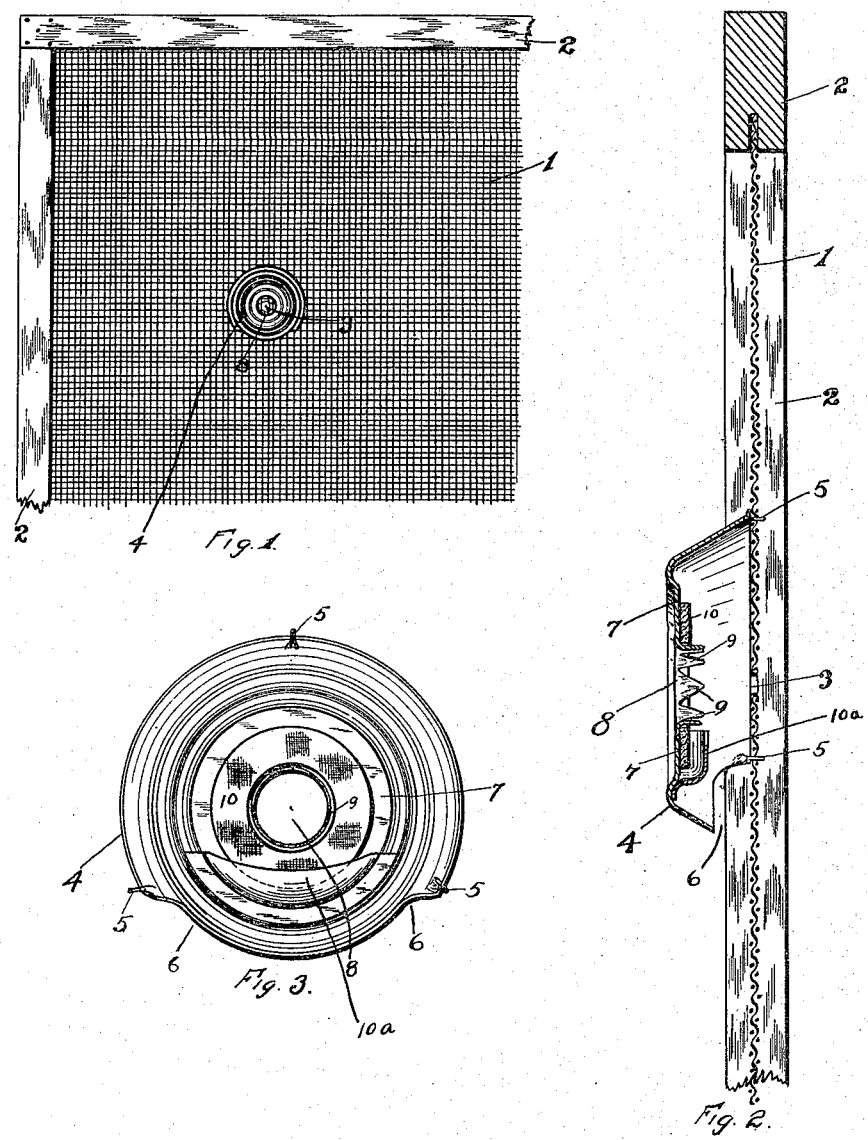
Inventor
Emanuel Kromer.

UNITED STATES PATENT OFFICE.

EMANUEL KROMER, OF SPOKANE, WASHINGTON.

FLY-KILLER.

1,166,606.   Specification of Letters Patent.   Patented Jan. 4, 1916.

Application filed May 25, 1914. Serial No. 840,908.

*To all whom it may concern:*

Be it known that I, EMANUEL KROMER, a citizen of the United States, residing at Spokane, in the county of Spokane and State of Washington, have invented certain new and useful Improvements in Fly-Killers, of which the following is a specification.

My invention relates to fly killers and aims to provide a device of the character referred to in which the dead flies are not scattered all over a building.

Further, my invention is superior to those types of fly killers using sticking paper, on which there may be a great number of flies and these flies being in the various stages of disintegration.

The main object of my invention resides in the provision of a fly killer adapted to be attached to a screen covering either a door or window or other opening, as may be desired, the same being constructed to attract and eliminate the flies either on the inside or on the outside of a screen portion. In carrying out this end, I have resorted to the use of a killer bait, supporting this bait in a manner that it is protected both from the rain and sun.

Other objects of my invention will become more apparent after a further detailed description of the accompanying drawings, in which similar characters of reference designate corresponding parts, and in which:

Figure 1 is a partial face view of a screen structure with my improved fly killer applied thereto, Fig. 2 is an enlarged central vertical section through the killer shown in Fig. 1, and, Fig. 3 is a face view of my killer shown detached looking from the right of Fig. 2.

In carrying out my invention, I have shown a familiar type of screen 1, as being supported from any desirable framework such as is shown at 2. Before my improved killer is applied to a screen, I provide the same with a suitable aperture such as is shown at 3, this aperture being preferably formed by the insertion of a tapered tool such as the pointed end of a lead pencil, to distort the wires sufficiently to form a hole large enough for the free passage of a fly therethrough. After the formation of the hole 3, the cover member is applied to the screen. This cover member is preferably provided with a plurality of prongs such as are shown at 5, these prongs passing through the squared portion of the screen and may or may not be subsequently bent to permanently hold the device in place. The lower portion of the cover 4 is also preferably provided with an open portion such as is shown at 6, while its face wall 7 is shown as being provided with a central opening 8, this opening being formed by forcing the metal inwardly after the manner shown in Fig. 2, whereby a plurality of spurs 9 are formed. These spurs 9 serve the purpose of a suitable support for a killer bait such as is shown at 10, this killer bait being preferably of an absorbent nature and having its lower portion below the level of the top edge of a container or receptacle $10^a$ disposed upon the inner portion of the face wall 7. By filling this receptacle $10^a$ with a suitable liquid poison or other killer, the absorbent nature of the killer bait 10 is such that the fluid will to all intents and purposes, be located concentrically with the opening 8. However, if desired, this killer bait may either be coated or saturated with some poisonous or fly killing substance prior to its application to the position shown in Fig. 3 and the receptacle $10^a$ dispensed with, but it renders the device more serviceable and more readily accessible by the use of the container. It is to be understood that it is advisable to use a killing fluid, or to so treat the member 10 that it acts in the capacity of a lure for the flies, this member being, if desired, permanently held in the position shown in Fig. 2, by bending back of the inner ends of the spurs 9. However, it is not essential that these spurs permanently hold the bait in place as it may be desirable to sometime renew the same.

The operation of my device is as follows: The screen 1 is first provided with a suitable aperture 3 and the cover 4 subsequently applied. This cover member is preferably so located with respect to the opening 3 that its central opening 8 is in direct alinement with the opening 3. If the receptacle $10^a$ is used, it is understood that this receptacle is initially filled with some fly killing fluid and the member 10 applied in the manner shown in Fig. 2, this member being preferably of an absorbent nature and, therefore, becoming saturated. In the absence of the receptacle $10^a$, the member 10 is initially coated or otherwise treated with some fly killing preparation to serve the same thing and in either case, it is held in place upon the spurs 9. The flies being attracted by the same, will enter the space between the screen and face wall of the member 4 through the openings 3 and 8. The lower open portion 6 is provided so that the dead flies will not collect in the bottom of the member 4, but permits them to drop to the floor or ground outside, it being understood that the attachment is preferably applied to the outside of a screen. It will further be apparent that the cover member 4, being provided along its edge with only one open portion and this open portion being toward the bottom, the bait will at all times be protected from sun and rain and, therefore, may be left on the screen an indefinite length of time.

What I claim, is:

1. A fly killer comprising, in combination with a screen having an aperture therein large enough to permit the passage of a fly therethrough, a cover member adapted to be attached to said screen over said aperture, said cover member having an open bottom and having a central opening in its face, spurs projecting inwardly from the edge of said face opening, and a killer bait adapted to be supported from said spurs.

2. A fly killer comprising in combination with a screen having an aperture therein large enough to permit the passage of a fly therethrough, a cover member adapted to be attached to said screen over said aperture, a killer bait disposed in the space between said screen and said cover, and a receptacle carried by said cover adapted to be filled with some killing preparation and disposed, with respect to said bait, that a portion of the bait is immersed.

In testimony whereof I affix my signature in presence of two witnesses.

EMANUEL KROMER.

Witnesses:
 DANE E. BURNS,
 EARL W. EDGINGTON.

Copies of this patent may be obtained for five cents each, by addressing the "Commissioner of Patents, Washington, D. C."